United States Patent [19]

Tomic et al.

[11] Patent Number: 5,655,273
[45] Date of Patent: Aug. 12, 1997

[54] MINIMAL CURL SEALING FLANGE

[75] Inventors: Mladomir Tomic, Appleton; Timothy J. May, Greenville; Catherine E. Kettner, Appleton; Gregory L. Petkovsek, Menasha, all of Wis.

[73] Assignee: Reynolds Consumer Products, Inc., Appleton, Wis.

[21] Appl. No.: 634,481

[22] Filed: Apr. 18, 1996

[51] Int. Cl.⁶ .................................................. B65D 33/00
[52] U.S. Cl. ................................. 24/587; 24/576; 383/63
[58] Field of Search ........................... 24/587, 576, 400; 383/63, 211

[56] References Cited

U.S. PATENT DOCUMENTS

| | | | |
|---|---|---|---|
| 4,354,541 | 10/1982 | Tilman | 150/3 |
| 4,372,793 | 2/1983 | Herz | 156/66 |
| 4,555,282 | 11/1985 | Yano | 156/68 |
| 4,673,383 | 6/1987 | Bentsen | 493/381 |
| 4,698,118 | 10/1987 | Takahashi | 156/499 |
| 4,731,911 | 3/1988 | Gould | 24/587 |
| 4,756,629 | 7/1988 | Tilman et al. | 383/63 |
| 4,792,240 | 12/1988 | Ausnit | 383/63 |
| 4,835,835 | 6/1989 | Gould | 29/527.2 |
| 4,969,967 | 11/1990 | Sorensen et al. | 156/66 |
| 5,004,356 | 4/1991 | Matsui | 383/63 |
| 5,012,561 | 5/1991 | Porchia et al. | 24/587 |
| 5,053,091 | 10/1991 | Giljam et al. | 156/66 |
| 5,185,909 | 2/1993 | Inagaki | 24/587 |
| 5,188,461 | 2/1993 | Sorensen | 383/63 |
| 5,216,787 | 6/1993 | Custer et al. | 24/587 |
| 5,238,306 | 8/1993 | Heintz et al. | 383/63 |
| 5,242,516 | 9/1993 | Custer et al. | 156/66 |
| 5,335,997 | 8/1994 | Kanemitsu et al. | 383/63 |
| 5,384,942 | 1/1995 | Siegel | 24/587 |
| 5,474,382 | 12/1995 | May | 383/211 |

FOREIGN PATENT DOCUMENTS

| | | | |
|---|---|---|---|
| 0398732 | 11/1990 | European Pat. Off. | 24/587 |
| 0477940 | 12/1953 | Italy | 24/576 |
| 0489529 | 6/1955 | Italy | 24/576 |

*Primary Examiner*—Victor N. Sakran
*Attorney, Agent, or Firm*—Alan T. McDonald

[57] ABSTRACT

The present invention sets forth a profile sealing strip having a lateral flange and a sealant layer. The lateral flange includes a first section, a second section, and a middle section being disposed between and connected to the first and second sections. The closure portion has a base connected to the middle sections and protruding beyond the upper surfaces of the first and second sections. The structure of the sealant layer and the lateral flange are modified so as to reduce the curl experienced during the cooling process after the lateral flange and the sealant layer are attached to one another.

61 Claims, 6 Drawing Sheets

MINIMAL CURL SEALING FLANGE

FIELD OF THE INVENTION

The present invention generally relates to a sealing device attached to a package which allows for resealable sealing of the package. In particular, the present invention relates to structural features of the layers of the sealant material which inhibit the curvature of those layers during manufacturing.

BACKGROUND OF THE INVENTION

Resealable packages are widely used in the packaging of a variety of products, especially food. Resealable packages are convenient in that after the initial opening, consumers can close and reseal the package to better preserve the enclosed contents. Thus, a consumer avoids having to locate a storage container for the unused portion of the products in the package. As such, providing products in resealable packages appreciably enhances the marketability of those products.

Often, a resealable sealing device is produced as a separate item from the package and is attached to and made integral with the package at a later point in the manufacturing process. A common resealable sealing device is a reclosable zipper which is affixed to the package by a heat and pressure sealing process. The zipper generally includes a pressure fastenable seal in the form of a rib, or male member, located on one package wall and a mating groove, or female member, located on an opposing package wall. The interlocking male and female member of the closure arrangement are typically made of a flexible polymeric material.

Attaching a reclosable zipper to the package is fairly simple when both the zipper and the package material are made of compatible materials. By applying heat and pressure in the typical heat-sealing process, the zipper and package are made integral. A good example of this concept is a reclosable polyethylene sandwich bag utilizing a polyethylene zipper. Alternatively, in some arrangements, the packages and zipper devices are made from different materials. For example, packages made from polyester not only protect food from minor air and water losses but also minimize flavor scalping from food. But, these polyester packages often have polyethylene or polypropylene zippers. In this situation, a sealant layer between the zipper and the package is used which adequately bonds to both of the dissimilar materials. Thus, one side of the sealant layer bonds with the material of the zipper, while the other side of sealant layer bonds with the material of the package. Generally, the sealant layer is co-extruded with the closure device such that the sealant layer is connected to the closure device. The sealant layer is usually attached to a flange on the closure device. A method for co-extruding a sealant layer with a closure profile is disclosed in U.S. Pat. No. 5,242,516 issued to Custer et al. which is herein incorporated by reference.

Closure devices having an attached sealant layer are produced in long strands which are usually wound onto spools. When the closure devices are to be placed onto the packages, they are unwound from those spools and cut to the appropriate length.

However, it has been shown that the sealant material generally cannot be co-extruded with the closure profile without causing the closure device to become distorted, or curled, after the two pieces are cooled due to the differences in the coefficient of thermal expansion between the two materials comprising the sealant layer and closure device. Problems are experienced in winding the strands of closure device around the spool if the closure device has a curled portion. Furthermore, bonding the closure device to the package is much more difficult if the closure device is curled.

A need therefore exists to provide a structure at the interface between the layers of the closure devices to minimize the curling of the closure device after it has been made integral with the sealant layer when the two pieces are co-extruded.

SUMMARY OF THE INVENTION

In one particular embodiment of the present invention, a profile sealing strip is shown which is to be affixed to a sealant layer. The profile sealing strip includes a lateral flange having a first section, a second section, and a middle section being disposed between and connected to the first and second sections. The first and second sections have a radius of curvature causing curvature in an upward direction such that portions of the edges on the first and second sections are an uppermost portion of the lateral flange. The closure portion has a base connected to the middle sections and protruding beyond the upper surfaces of the first and second sections. The sealant layer is then attached to the curved first and second sections of the lateral flange which causes the pre-existing curve to straighten.

In another embodiment, the thickness of the lateral flange is increased to provide extra rigidity to reduce curl caused by the cooling process. Alternatively, the sealant layer is made extremely thin to accomplish the same goal. In yet another alternative, the sealant layer and the lateral flange are tapered such that additional thickness of the lateral flange is present near the edges of the first and second sections.

In yet another embodiment, the sealant layer is embedded into one channel within the lateral flange which includes projections defining the region for the embedded sealant layer. The sealant layer may also be placed on and between ribs which extend downwardly from the lateral flange.

In yet a further embodiment, the sealant layer is attached to only points along the lateral flange.

In another embodiment, a secondary layer is placed on the lateral flange opposite the sealant layer to counteract the curvature encountered during the cooling process. A buffer layer may be placed between the sealant layer and lateral flange as well.

The sealant layer may be attached to the lateral flange partially, or completely, outside the die through which the two layers are coextruded. One or both layers may be cooled in a cooling bath prior to attachment. And, rollers may be employed to form the layers after attachment.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Figure 1:
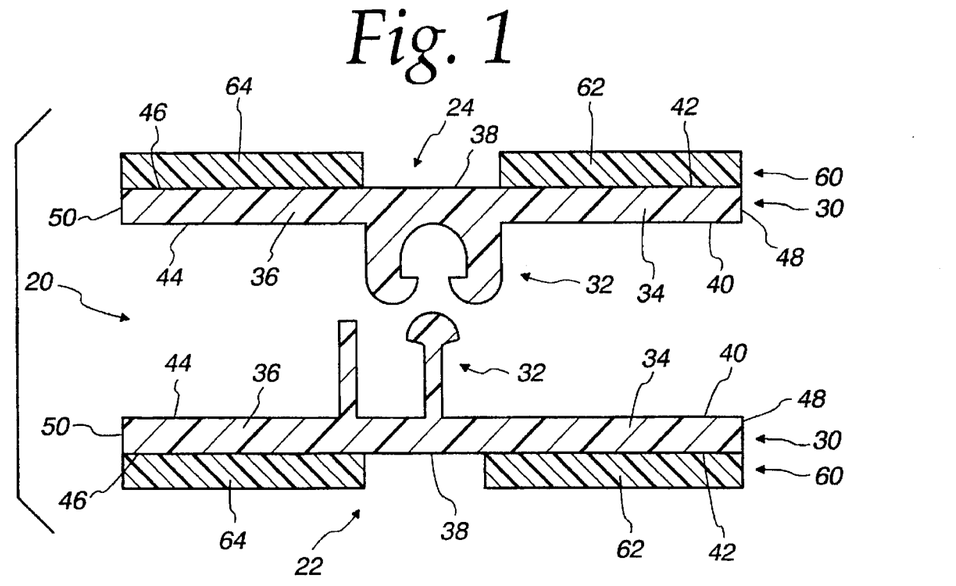
FIG. 1 is a sectional view of preferred male and female profile sealing strips.

Turning now to the drawings, FIG. 1 is a sectional view of a preferred reclosable seal 20 in its opened position. The reclosable seal 20 includes two parts, a male profile strip 22 and a female profile strip 24 which collectively are commonly known as a zipper. The male profile strip 22 is placed on one edge of a package while the female profile strip 24 is placed on an opposing edge of the package. When pressure is applied to the male and female profile strips 22 and 24, they engage and form a reclosable sealing device for a package. Likewise, when the male and female profiles 22 and 24 are pulled away from each other, the two disengage and the package is opened. Generally, the male and female profile strips 22 and 24 are manufactured separately from the package and are subsequently attached to a package. The present invention relates to the structure of the male and female profile strips 22 and 24 prior to being affixed to those packages.

Continuing with reference to FIG. 1, the male profile strip 22 and female profile strip 24 both have similar components which are referenced together. Each male and female profile strips 22 and 24 include a lateral flange 30 and closure portion 32. Each lateral flange 30 includes a first section 34, a second section 36, and a middle section 38 which is disposed between and is connected to its corresponding first section 34 and second section 36. The first section 34 has an upper surface 40 and lower surface 42 with the orientation of the male profile strip 22 dictating what is "upper" and "lower" since it is the male profile strip 22 which is referred to in FIGS. 3–18. Likewise, the second section 36 includes an upper surface 44 and a lower surface 46. At the far ends of the first section 34 and the second section 36 are edges 48 and 50, respectively. A base of the closure portion 32 is connected to the middle section 38 of the lateral flange 30 and extends beyond the upper surfaces 40 and 44 of the first and second sections 34 and 36.

Figure 2:
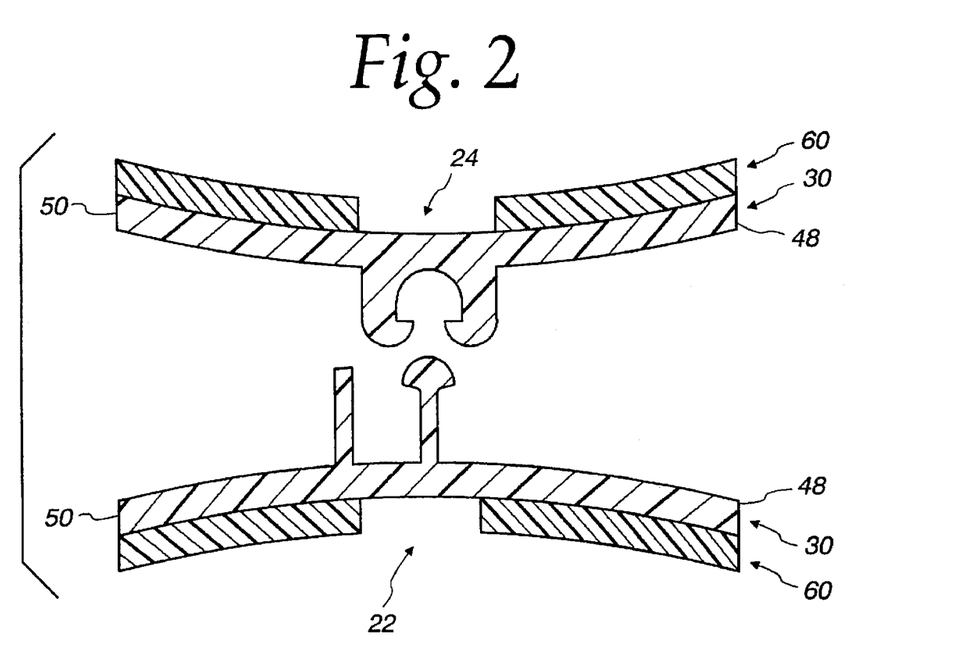
FIG. 2 is a sectional view of typical male and female profile sealing strips illustrating the inherent curling.

A sealant layer 60 is attached to the lower surfaces 42 and 46 of the first and second sections 34 and 36. The sealant layer 60 has a first portion 62 corresponding to the first section 34 of the lateral flange 30 and a second portion 64 corresponding to the second section 36 of the lateral flange 30. The first portion 62 and second portion 64 of the sealant layer 60 generally do not cover the middle section 38 of the lateral flange 30. Referring now to FIG. 2, the male profile strip 22 and the female profile strip 24 are distorted from the manufacturing processes which were used to produce them. Typically, the method of producing the male profile strip 22 and the female profile strip 24 is a co-extrusion process which combines the sealant layer 60 with the lateral flange 30 at elevated temperatures. When the sealant layer 60 is placed on the lateral flange 30 during the co-extrusion process the lateral flange 30 becomes distorted due to the difference in the coefficients of thermal expansion between the material in the lateral flange 30 and the material of the sealant layer 60 as they cool. The coefficient of thermal expansion of the two materials can vary by as much as 50% to 100% depending on the materials chosen. Thus, the co-extrusion of the sealant layer 60 as a single, continuous layer simultaneously with a planar lateral flange 30 typically results in the deformation of the lateral flange 30. The lateral flange 30 curls in the direction of the material having a higher coefficient of thermal expansion (usually the sealant layer 60) after the lateral flange 30 and the sealant layer 60 have cooled.

FIG. 2 is an illustration of the sealant layer 60 having the higher coefficient of thermal expansion resulting in the curling of the lateral flange 30 away from the closure portion 32. The radius of curvature of the lateral flange 30 after cooling is inversely proportional to the difference in the coefficients of thermal expansion between the materials of the lateral flange 30 and the sealant layer 60. In other words, because the temperatures of the sealant layer 60 and the lateral flange 30 are approximately the same when the two come into contact with one another during co-extrusion, the difference in the coefficients of thermal expansion dictate the amount of curl after cooling. If there is a slight difference, then the radius of curvature is large (i.e. the lateral flange 30 remains relatively flat). If there is a large difference in the coefficients of thermal expansion, then the radius of curvature is smaller (i.e. lateral flange 30 is more curled).

As can be seen in FIG. 2, the edges 48 and 50 of the lateral flange 30 experience the most distortion. Keeping in mind that the coextrusion process produces long strands of male and female profile strips 22 and 24 which are wound onto rolls, the curling of the male and female profile strips 22 and 24 can cause problems in the winding process. Furthermore, the curling of these strips 22 and 24 can also cause problems when they are affixed to packages. The present invention details various modifications to the structure of the sealant layer 60 and the lateral flange 30 which attenuate the curling of the male and female profile strips 22 and 24 illustrated in FIG. 2.

The lateral flange 30 and the closure portion 32 are generally made of the same material. Examples of materials used for the lateral flange 30 and the closure portion 32 include polyethylene terephthalates, high density polyethylene, low density polyethylene, linear low density polyethylene, and polypropylene. Examples of the ranges of the coefficients of thermal expansion for low density polyethylene and polypropylene are $70-110 \times 10^{-6}$ in/in°F. and $65-95 \times 10^{-6}$ in/in°F., respectively. The melting temperature for low density polyethylene is approximately 98°–115° C. The melting temperature for polypropylene is approximately 150°–175° C.

The use of a low-cost material, such as low density polyethylene (LDPE), for making the lateral flange 30 and the closure portion 32 results in a significant savings in materials cost compared to a profile strip made of a substantially pure ionomer resin, such as SURLYN® (trademark of E.I. DuPont de Nemours & Co. of Wilmington, Del.). Although the actual volume of the ionomer resin needed for a single profile strip appears small, a facility mass producing large amounts of resealable sealing devices would utilize large amounts of the ionomer resin. Thus, even a minor cost savings in such a material can result in a significant reduction in cost of material.

The sealant layer 60 is usually made of a different material than the lateral flange 30 and the closure portion 32. Examples of materials used for the sealant layer 60 include ethylene vinyl acetate, ethylene acrylic acid, a polymer rubber resin blend, and ethylene-methyl acrylate. Examples of the ranges for the coefficients of thermal expansion for ethylene vinyl acetate and ethylene acrylic acid are $160-200 \times 10^{-6}$ in/in°F. and $160-250 \times 10^{-6}$ in/in°F., respectively. Ethylene vinyl acetate has a melting temperature of about 105°–110° C. Ethylene-methyl acrylate has a melting temperature of about 85° C.

Because of the similarity in components in each of the following figures, the reference numerals shall remain the same, although slight variances in those structures may be seen.

Figure 3:
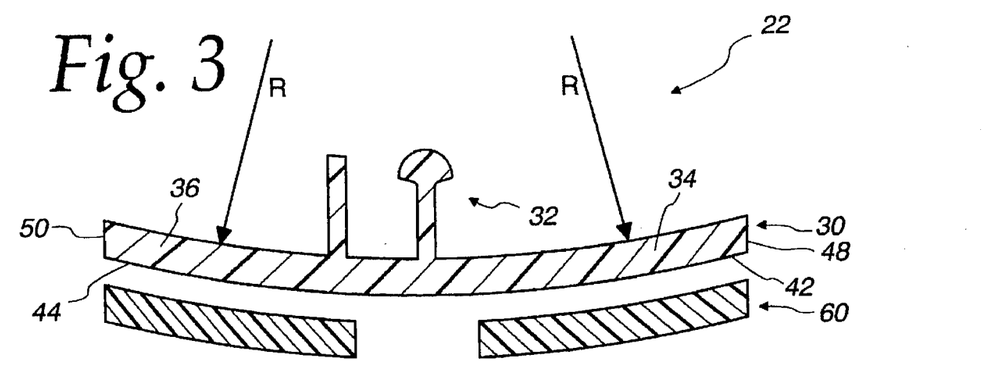
FIG. 3 is a sectional view of one embodiment of the present invention utilizing a pre-curled lateral flange that is to be attached to a sealant layer.

FIG. 3 is a sectional view of a male profile strip 22 showing a curved lateral flange 30 prior to being attached to the sealant layer 60. The reasoning for the pre-attachment curvature is that when the sealant layer 60 is attached to the lateral flange 30 and subsequently cooled, the curling effect due to the cooling process causes the curved lateral flange 30 to become straight.

Typically, the radius of curvature R of the curved lateral flange 30 is designed such that it offsets the curl due to the cooling process from the process temperature. A portion of the edges 48 and 50 near the lower surfaces are generally above part of the closure portion 32. In some cases where the difference in coefficients of thermal expansion is high, the edges 48 and 50 may be completely above the closure portion 32. During the cooling process, the radius of curvature R increases. Preferably, the radius of curvature R approaches infinity after the cooling process has occurred.

The thicknesses of the sealant layer 60 as compared to lateral flange 30 is also a consideration in designing the radius of curvature R of the lateral flange 30. Typically, the thickness of the sealant layer 60 is in the range from approximately 0.002 inch to about 0.003 inch. The typical thickness of the lateral flange 30 is in the range from about 0.006 inch to about 0.008 inch. When the materials described above for the sealant layer 60 and for the lateral flange 30 are used and the first and second sections 34 and 36 are each approximately 0.25 inch to 0.40 inch in length, the radius of curvature R before the sealant layer 60 is attached to the lateral flange 30 is in the range from about 0.10 inch to about 0.25 inch.

To produce the male profile strip 22 with the radius of curvature R, the opening of the die through which the lateral flange 30 is extruded includes a curved opening portion. Then, the sealant layer 60 is attached to the curved lateral flange 30 usually with heat being provided to soften the materials.

Figure 4:
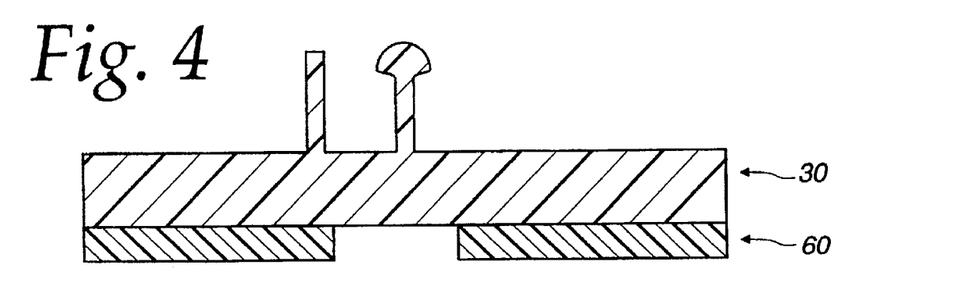
FIG. 4 is a sectional view of another embodiment of the present invention utilizing an extra thick lateral flange.

FIG. 4 illustrates another embodiment in which material has been added to the lateral flange 30 to increase its thickness. The amount of curling due to the cooling process depends on the rigidity of the lateral flange 30. By adding additional thickness, the rigidity of the lateral flange 30 is increased and the curling effect is reduced. The thickness of the lateral flange 30 is in the range from approximately 0.010 inch to about 0.012 inch while the sealant layer 60 is in the range from about 0.002 inch to about 0.003 inch. Thus, the thickness of the lateral flange 30 is typically at least three times the thickness of the sealant layer 60. The materials delineated above for the sealant layer 60 and for the lateral flange 30 are typically used.

Figure 5:
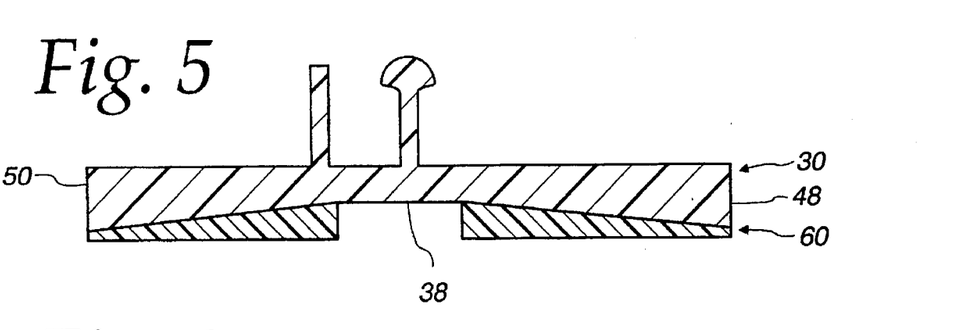
FIG. 5 is a sectional view of another embodiment of the present invention utilizing a tapered sealant layer and tapered lateral flange.

FIG. 5 illustrates a tapered sealant layer 60 and a tapered lateral flange 30. Because the amount of curl tends to increase towards the edges 48 and 50, applying extra rigidity near the edges 48 and 50 tends to minimize the amount of curl experienced. The tapering on both the lateral flange 30 and the sealant layer 60 is usually linear, although it may be nonlinear as well. The thickness of the sealant layer 60 near the edges 48 and 50 is approximately 0.0005 inch while its thickness near the middle section 38 ranges from approximately 0.002 inch to about 0.003 inch. The lateral flange 30 has a range from about 0.006 inch to about 0.008 inch near the middle section 38 while the thickness near the edges 48 and 50 is approximately 0.009 inch to about 0.010 inch. Again, the materials delineated above for the sealant layer 60 and for the lateral flange 30 are typically used.

Figure 6:
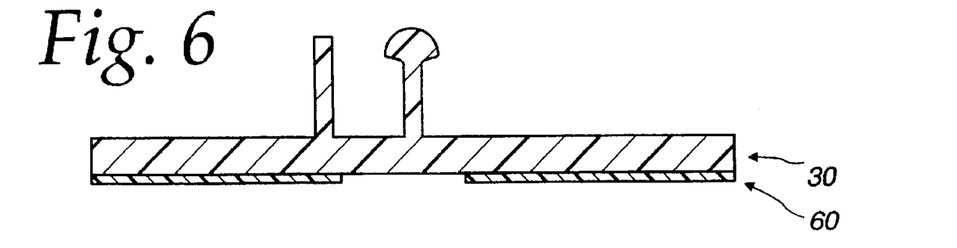
FIG. 6 is a sectional view of another embodiment of the present invention utilizing an extra thin sealant layer.

FIG. 6 illustrates another embodiment similar to FIG. 4 in which material has been removed from the sealant layer 60 to decrease its thickness. As stated previously, the amount of curling due to the cooling process depends on the rigidity of the lateral flange 30 in comparison to the contraction force of the sealant layer 60. By removing material from the sealant layer 60, the force caused by its contraction is reduced and the curling effect is thereby reduced. The thickness of the lateral flange 30 is in the range from about 0.006 inch to about 0.008 inch, while the thickness of the sealant layer 60 is in the range from about 0.0005 inch to about 0.001 inch. Once again, the materials delineated above for the sealant layer 60 and for the lateral flange 30 are typically used.

Figure 7:
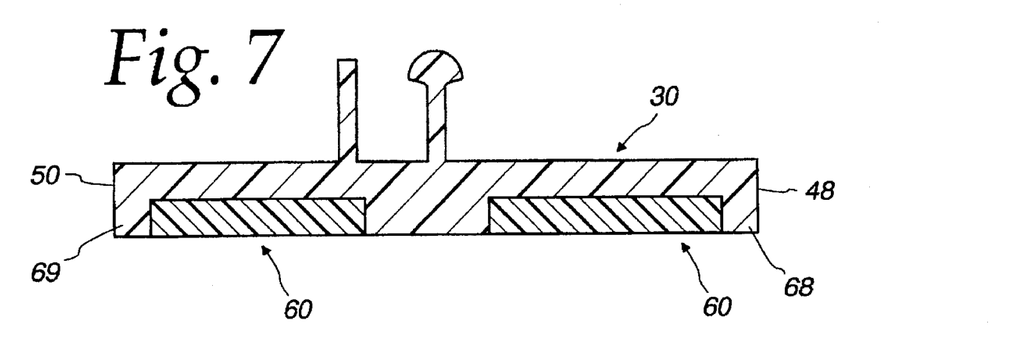
FIG. 7 is a sectional view of another embodiment of the present invention utilizing an embedded sealant layer.

FIG. 7 illustrates an embedded sealant layer 60 in the lateral flange 30. The lateral flange 30 includes two projections 68 and 69 near the edges 48 and 50. Here, the lack of a sealant layer 60 near the edges 48 and 50 limits the amount of curl experienced by the lateral flange 30. The projections 68 and 69 also provide extra rigidity. The thickness of the lateral flange 30 is in the range from about 0.006 inch to about 0.008 inch, while the sealant layer 60 is in the range from about 0.002 inch to about 0.003 inch. The projections 68 and 69 extend in a downward direction from the lateral flange 30 in the range from about 0.002 inch to about 0.003 inch such that they are nearly flush with the sealant layer 60. Once again, the materials delineated above for the sealant layer 60 and for the lateral flange 30 are typically used.

Figure 8:
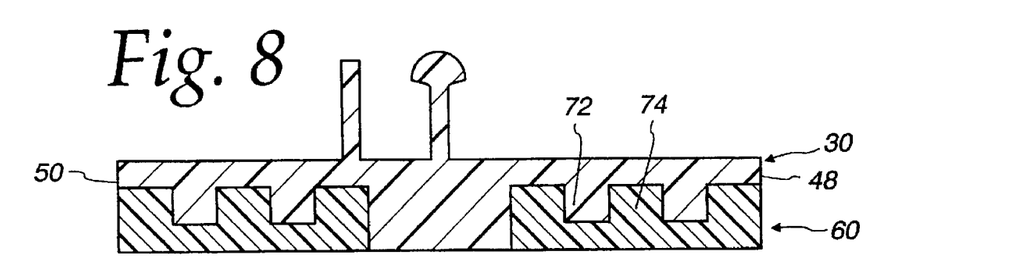
FIG. 8 is a sectional view of another embodiment of the present invention utilizing multi-channeled lateral flange and a conforming sealant layer.

FIG. 8 illustrates a sealant layer 60 that is surrounding the ribs 72 which extend downwardly from the lateral flange 30. Between each pair of adjacent ribs 72 are channels 74 in which the sealant layer 60 is also present. Here, the ribs 72 add rigidity to the lateral flange 30 to limit the amount of curl experienced by the lateral flange 30. The thickness of the lateral flange 30 is in the range from about 0.006 inch to about 0.008 inch. The ribs 72 extend downwardly from the lateral flange 30 in the range from about 0.001 inch to about 0.0025 inch. The thickness of the sealant layer 60 is in the range from about 0.002 inch to about 0.003 inch in the area of the channels 74, and from about 0.0005 to about 0.0015 in the area below the ribs 72. Again, the materials delineated above for the sealant layer 60 and for the lateral flange 30 are typically used.

Figure 9:
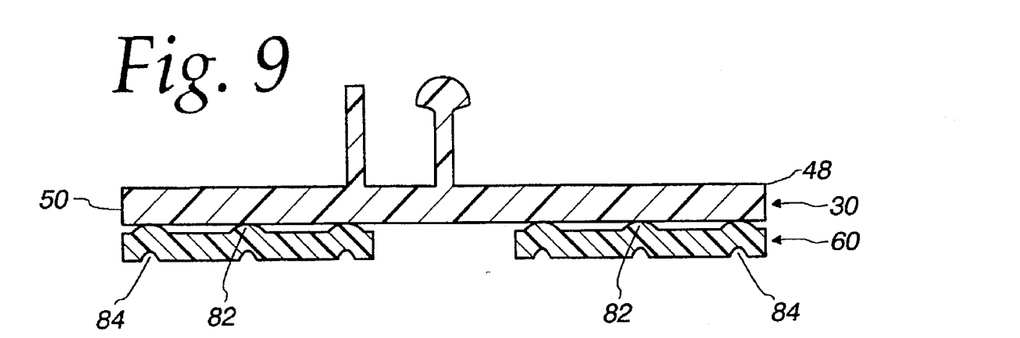
FIG. 9 is a sectional view of another embodiment of the present invention utilizing a sealant layer having projections which contact the lateral flange.

FIG. 9 illustrates a sealant layer 60 that includes a plurality of upward projections 82 extending upwardly toward, and attached to, the lateral flange 30. Behind each upward projection 82 is a void 84. The shape of the upward projections 82 can be other arcuate as shown in FIG. 9, or other shapes such as polygonal. Because only points of the sealant layer 60 contact the lateral flange 30, the amount of curl experience by the lateral flange 30 after cooling is reduced. The regions of the sealant layer 60 between the upward projections 82 allows for the contraction as the sealant layer 60 cools. The voids 84 allow for contraction during the cooling process as well. The voids 84 can be on the surface of the sealant layer 60 or within the sealant layer 60. The thickness of the lateral flange 30 is in the range from about 0.006 inch to about 0.008 inch. The upward projections 82 extend upwardly from the sealant layer 60 in the range from about 0.0005 inch to about 0.001 inch. The sealant layer 60 is in the range from about 0.002 inch to about 0.003 inch in the area between the upward projections 82. Again, the materials delineated above for the sealant layer 60 and for the lateral flange 30 are typically used.

Figure 10:
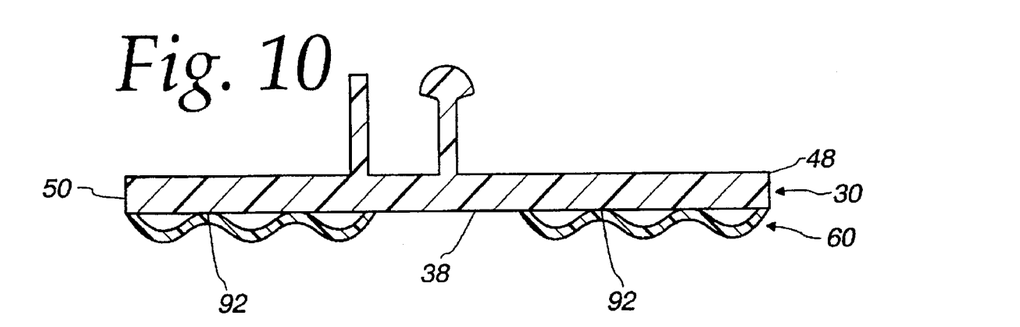
FIG. 10 is a sectional view of another embodiment of the present invention utilizing a sealant layer having a sinusoidal shape with peaks that contact the lateral flange.

FIG. 10 illustrates a sealant layer 60 which employs the point contact concept of FIG. 9 except the sealant layer 60 is repetitiously curved with peaks 92 contacting the lateral flange 30. The shape of the curve can be any shape although preferably it is sinusoidal. Because only the peaks 92 of the sealant layer 60 contact the lateral flange 30, the amount of curl experience by the lateral flange 30 is reduced. The region between the peaks 92 allows for the contraction as the sealant layer 60 cools. Preferably, the peaks 92 are located adjacent the middle section 38 and near the edges 48 and 50. The thickness of the lateral flange 30 is in the range from about 0.006 inch to about 0.008 inch. The sealant layer 60 is in the range from about 0.002 inch to about 0.003 inch. Again, the materials delineated above for the sealant layer 60 and for the lateral flange 30 are typically used.

Figure 11:
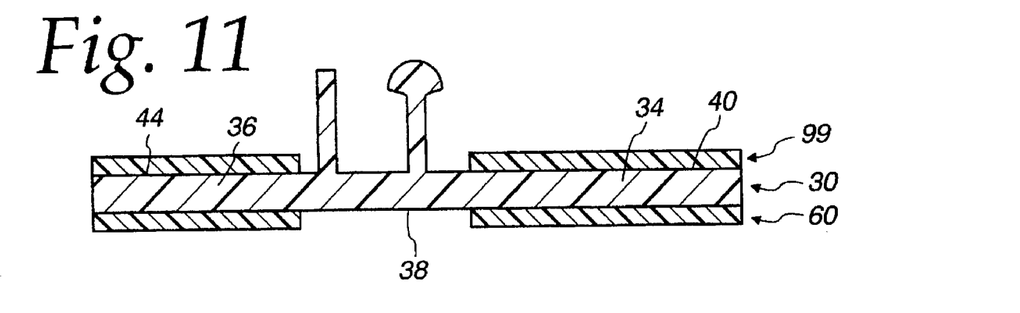
FIG. 11 is a sectional view of another embodiment of the present invention utilizing an additional secondary layer attached to the lateral flange opposite the sealant layer.

FIG. 11 illustrates the lateral flange 30, the sealant layer 60, and a secondary layer 99 attached to the upper surfaces 40 and 44 of the first and second sections 34 and 36 of the lateral flange 30. The secondary layer 99 serves the purposes of counteracting the contractive forces caused by the sealant layer 60 during the cooling process. It is preferable to use a material in the secondary layer 99 with a coefficient of thermal expansion that is approximately within 20% of that of the material of the sealant layer 60. Consequently, the secondary layer 99 may be made of the same material as the sealant layer 60. The thickness of the lateral flange 30 is in the range from about 0.006 inch to about 0.008 inch. The sealant layer 60 is in the range from about 0.002 inch to about 0.003 inch in the area between the upward projections 82. The secondary layer 99 is generally about the same thickness as the sealant layer 60. Again, the materials delineated above for the sealant layer 60 and for the lateral flange 30 are typically used.

Figure 12:
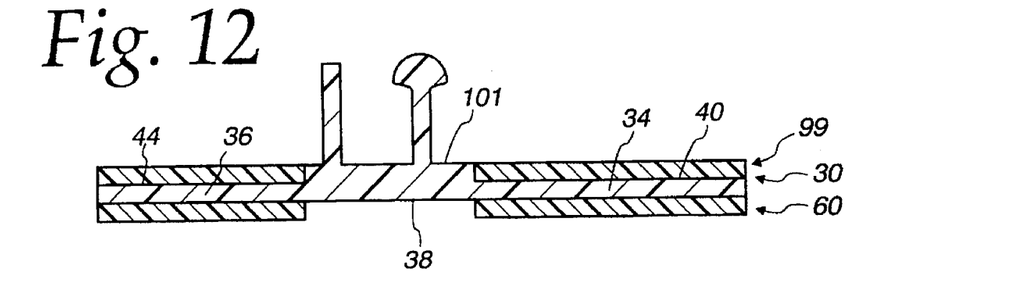
FIG. 12 is a sectional view of another embodiment of the present invention utilizing an additional secondary layer attached to the lateral flange opposite the sealant layer with a middle section of the lateral flange being raised.

FIG. 12 is very similar to FIG. 11 except that the middle section 38 now has a raised uppermost surface 101 which extends to at least the same height as the secondary layer 99. The secondary layer 99, the sealant layer 60, and the lateral flange 30 are typically in the range from about 0.002 inch to about 0.004 inch. It is preferable to use a material in the secondary layer 99 with a coefficient of thermal expansion that is approximately within 20% of that of the material of the sealant layer 60. Consequently, the secondary layer 99 may be made of the same material as the sealant layer 60. Again, the materials delineated above for the sealant layer 60 and for the lateral flange 30 are typically used.

Figure 13:
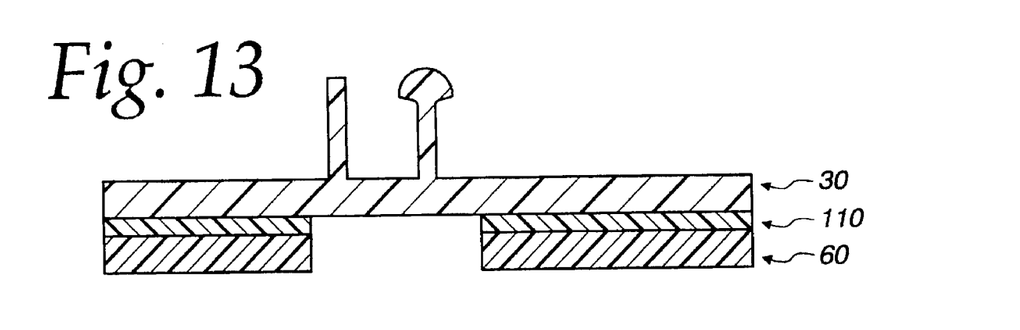
FIG. 13 is a sectional view of another embodiment of the present invention utilizing a buffer layer between the lateral flange and the sealant layer.

FIG. 13 illustrates the sealant layer 60, the lateral flange 30, and a buffer layer 110 positioned therebetween. The buffer layer 110 serves the purpose of absorbing some of the contractional force which is being placed upon it by the sealant layer 60 such that the lateral flange 30 does not distort as much. By adding extra material, the buffer layer 110 also serves to add rigidity to the overall structure. Typically, the buffer layer 110 has a coefficient of thermal expansion that lies between the coefficients of thermal expansion of the sealant layer 60 and of the lateral flange 30. The lateral flange 30 has a thickness in the range from about 0.006 inch to about 0.008 inch. The sealant layer 60 has a thickness in the range from about 0.002 to about 0.003 inch. And, the buffer layer 110 has a thickness in the range from about 0.001 inch to about 0.002 inch. Again, the materials delineated above for the sealant layer 60 and for the lateral flange 30 are typically used.

Figure 14:
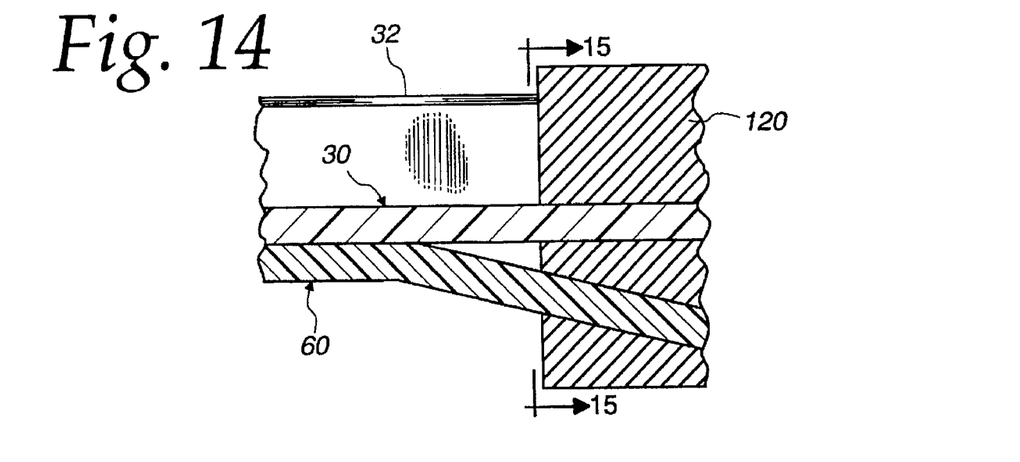
FIG. 14 is a sectional view of die which may be used to produce the embodiments of FIG. 15.

FIG. 14 illustrates a section view of a die 120 which is coextruding the sealant layer 60 with the lateral flange 30. The view is a side view which is taken along either the first section 34 or second section 36 of the lateral flange 30 and the corresponding region of the sealant layer 60. As can be seen, the sealant layer 60 and the lateral flange 30 combine outside the die which indicates that they have been exposed to a gas environment, likely air, which allows them to cool slightly. Because the amount of contraction is dependant on, among other factors, the temperature difference at the time of attachment and the final cooling temperature, reducing the temperature of both the lateral flange 30 and the sealant layer 60 decreases the amount of contraction.

Figure 15:
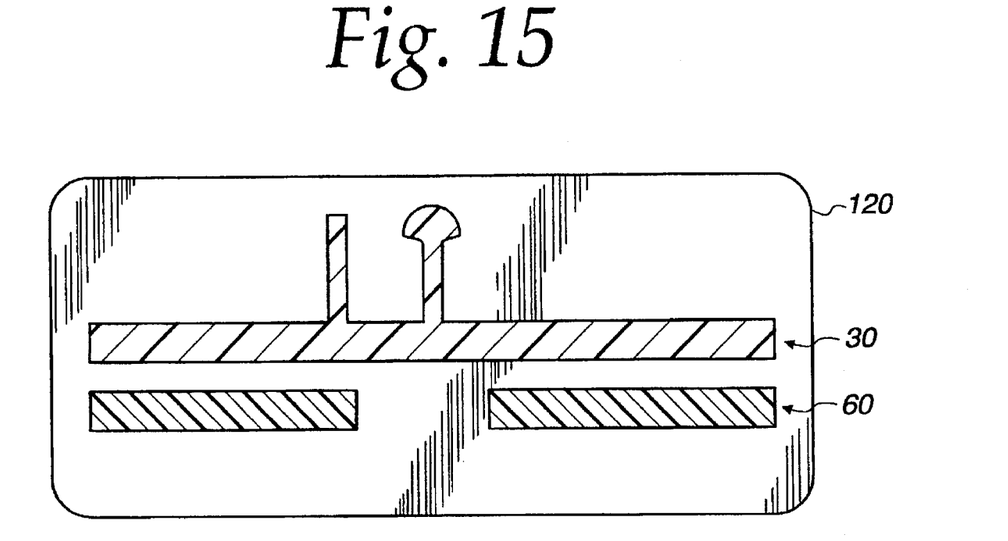
FIG. 15 is a sectional view of another embodiment of the present invention utilizing a sealant layer which is attached to lateral flange outside of the die in FIG. 14.

FIG. 15 illustrates a section front view of the sealant layer 60 and the lateral flange 30 leaving the die 120 of FIG. 14. Here, no portions of the sealant layer 60 and the lateral flange 30 are in contact until they have left the die 120. Thus, the sealant layer 60 is attached to the lateral flange 30 outside the die 120. The distance from the die 120 at which attachment occurs is proportional to the amount heat lost by the both the lateral flange 30 and the sealant layer 60.

Figure 16:
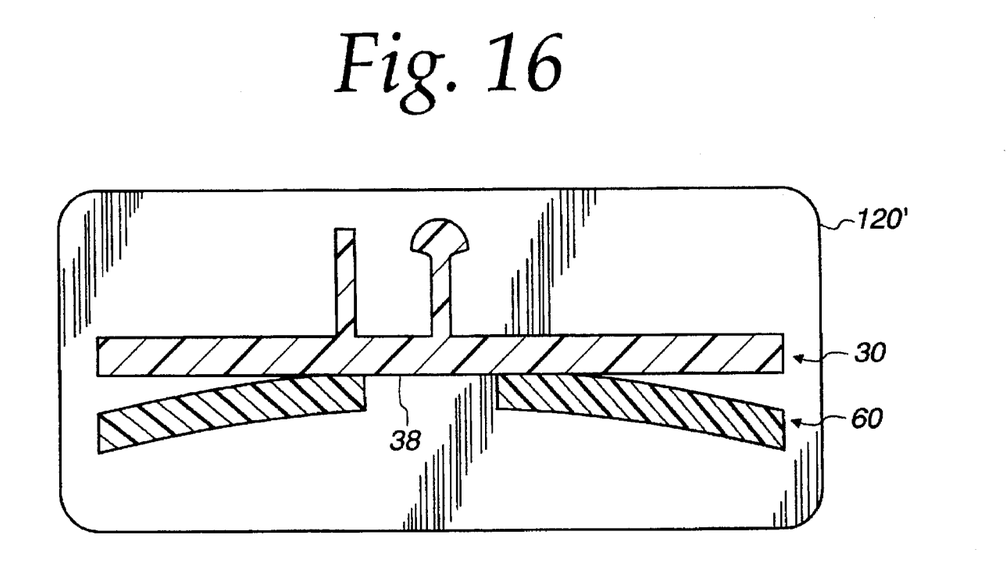
FIG. 16 is a sectional view of another embodiment of the present invention utilizing a sealant layer which is partially attached to lateral flange inside of a die similar to the die in FIG. 14.

FIG. 16 illustrates a section front view of the sealant layer 60 and the lateral flange 30 leaving an alternative die 120' similar to die 120 of FIG. 14. Here, portions of the sealant layer 60 are attached to the lateral flange 30 within the die 120'. As shown, the sealant layer 60 is attached to the lateral flange 30 near its middle section 38 within the die 120'. The remaining portions of the sealant layer 60 are attached to the lateral flange 30 at a known distance outside of the die 120'. Because the majority of the curl occurs toward the edges 48 and 50 of the lateral flange 30, allowing the corresponding portions of the sealant layer 60 to cool reduces the amount of curl experienced. The dimensions and materials for the lateral flange 30 and the sealant layer 60 which have been described previously can be extruded from the die in the manner illustrated in FIGS. 14-16. Furthermore, the secondary layer 99 in FIGS. 11-12 and the buffer layer 110 in FIG. 13 can also be extruded from an opening in the die 120' and merged with the lateral flange 30 and the sealant layer 60. Also, the die 120' can be designed to allow various shapes to be extruded therefrom so as to produce shapes of FIGS. 9 and 10.

Figure 17:
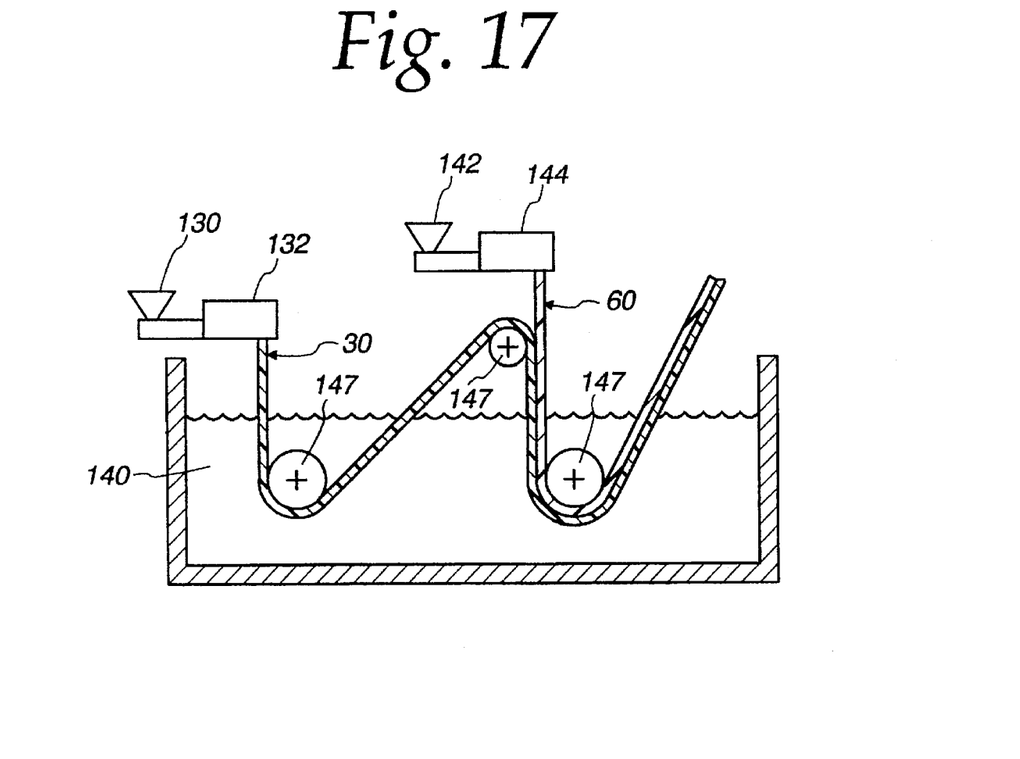
FIG. 17 illustrates a process wherein the sealant layer or the lateral flange is cooled before being joined.

FIG. 17 illustrates a process which is used to control the thermal characteristics of the lateral flange 30 and the sealant layer 60. The lateral flange 30 is produced by supplying a first hopper 130 with the material comprising the lateral flange 130. The material is then heated and extruded through a first die 132. The extruded lateral flange 30 is then passed through a cooling bath 140 before it is attached to the sealant layer 60.

The sealant layer 60 is produced by adding material to a second hopper 142, heating the material, and extruding the material through a die 144. After attachment of the sealant layer 60 to the lateral flange 30, the two are then returned to the cooling bath 140. Typically, a series of rollers 147 direct both the lateral flange 30 and the sealant layer 60 during the process.

Although FIG. 17 illustrates the lateral flange 30 being produced from the first hopper 130, the sealant layer 60 may be produced in the first hopper and placed through the coolant bath 140 prior to being connected to the lateral flange 30 which is produced by the second hopper. Furthermore, separate baths may be more suitable to this process in that it may be best to cool one portion of an extruded product at one temperature, while the entire assembly at a different temperature. The amount of heat given off by a hot layer is proportional to the heat transfer coefficient which, in turn, is dependant on the physical characteristics of the liquid. Therefore, certain types of liquid within the baths may be more suited for fast cooling of the layers (quenching) as opposed to some liquids which are more conducive to gradual cooling. As such, separate baths may include various types of liquid at different temperatures.

Figure 18:
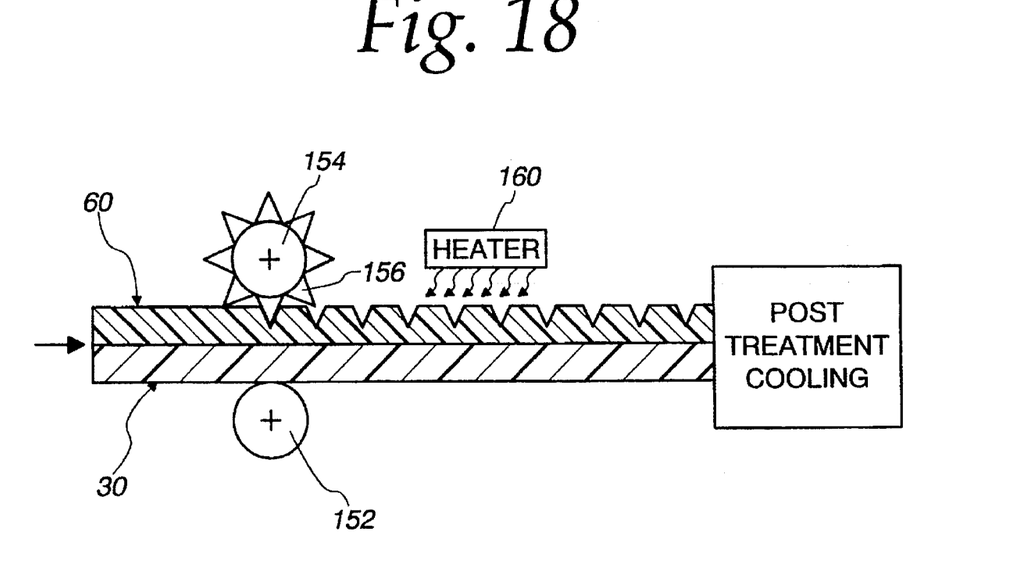
FIG. 18 illustrates a process wherein the sealant layer and the lateral flange are formed by rollers and heaters.

FIG. 18 illustrates the rolling of the sealant layer 60 and the lateral flange 30 to produce a flat structure. Here, separate rollers 152 and 154 roll the lateral flange 30 and the sealant layer 60. A pair of cooperating rollers are present over the first section 34 (FIG. 1) and the second section 36 (FIG. 1) of the lateral flange 30 and the corresponding portions of the sealant layer 60. As shown, the top roller 154 also has structure 156 on its periphery for knurling the sealant layer 60 which helps to relieve the internal stresses caused by the cooling. Heaters 160 may assist in softening the two layers to relieve stress prior to the post treatment cooling. Heaters may also be placed upstream of the rollers 152 and 154 to soften the material prior to the rolling process.

Each of these embodiments and obvious variations thereof is contemplated as falling within the spirit and scope of the invention, which is set forth in the following claims.

What is claimed is:

1. A profile sealing strip to be affixed to a package so as to provide said package with a resealable closure device, said profile sealing strip comprising:

a lateral flange having a first section, a second section, and a middle section being disposed between and connected to said first and second sections, said first and second sections each having a length, an Upper surface, a lower surface and an edge extending between said upper and lower surfaces, said first and second sections having a radius of curvature causing curvature in an upward direction such that a portion of said edges on said first and second sections is an uppermost portion of said lateral flange;

sealant layers attached to the lower surfaces of said first and second sections; and a closure portion having a base connected to said middle section and protruding beyond said upper surfaces of said first and second sections, wherein said lateral flange and said closure portion are made of a first material and said sealant layers are made of a second material, said first material and said second material having substantially different coefficients of thermal expansion.

2. The profile sealing strip of claim 1, wherein said radius of curvature causes said edges near said associated lower surfaces to be above part of said closure portion.

3. The profile sealing strip of claim 2, wherein said radius of curvature causes said edges near said associated lower surfaces to be completely above said closure portion.

4. The profile sealing strip of claim 1, wherein said radius of curvature increases in response to said sealant layers being attached to said lower surfaces of said first and second sections.

5. The profile sealing strip of claim 4, wherein said radius of curvature approaches infinity in response to said sealant layers being attached to said lower surfaces of said first and second sections.

6. The profile sealing strip of claim 1, wherein said first material is a material selected from the group consisting of polyethylene terephthalates, high density polyethylene, low density polyethylene, linear low density polyethylene, and polypropylene, and wherein said second material is a material selected from the group consisting of ethylene vinyl acetate, ethylene acrylic acid, a polymer rubber resin blend, and ethylene-methyl acrylate.

7. The profile sealing strip of claim 6, wherein said lateral flange has a first thickness in the range from about 0.006 inch to 0.008 inch, and said sealant layer has a thickness in the range from about 0.002 inch to about 0.003 inch.

8. The profile sealing strip of claim 1, wherein said lateral flange has a first thickness in the range from about 0.006 inch to 0.008 inch, and said sealant layers have a thickness in the range from about 0.002 inch to about 0.003 inch.

9. The profile sealing strip of claim 1, wherein said radius of curvature is in the range from about 0.10 inch to about 0.25 inch.

10. A profile sealing strip to be affixed to a package and provide said package with a resealable closure device, said profile sealing strip comprising:

a lateral flange made of a first material and having a first section, a second section, and a middle section disposed between and connected to said first and second sections, said first and second sections each having a length, an upper surface, a lower surface, and a first thickness defined between said upper and lower surfaces;

a closure portion made of said first material and having a base connected to said middle section, said closure portion protruding beyond said upper surfaces of said first and second sections; and sealant layers made of a second material and attached to said lower surfaces of said first and second sections of said lateral flange, said sealant layers having a second thickness being at least three times less than said first thickness, wherein said first material and said second material have substantially different coefficients of thermal expansion.

11. The profile sealing strip of claim 10, wherein said first thickness is in the range from about 0.010 inch to about 0.012 inch, and said second thickness is in the range from about 0.002 inch to about 0.003 inch.

12. The profile sealing strip of claim 10, wherein said first material is a material selected from the group consisting of polyethylene terephthalates, high density polyethylene, low density polyethylene, linear low density polyethylene, and polypropylene, and said second material is a material selected from the group consisting of ethylene vinyl acetate, ethylene acrylic acid, a polymer rubber resin blend, and ethylenemethyl acrylate.

13. The profile sealing strip of claim 12, wherein said first thickness is in the range from about 0.010 inch to about 0.012 inch, and said second thickness is in the range from about 0.002 inch to about 0.003 inch.

14. The profile sealing strip of claim 10, wherein said first thickness varies along said lengths of said first and second sections, said first thickness being least near said middle section.

15. The profile sealing strip of claim 14, wherein said second thickness of said sealant layers varies along said lengths of said first and second sections, said second thickness being greatest near said middle section.

16. The profile sealing strip of claim 15, wherein said first thickness is in the range from about 0.006 inch to about 0.008 inch near said middle section and in the range from about 0.009 inch to about 0.010 inch near edges on said first and second sections, and said second thickness is in the range from 0.002 inch to about 0.003 inch near said middle section and in the range from about 0.0005 inch to about 0.001 inch near said edges on said first and second sections.

17. The profile sealing strip of claim 10, wherein said first thickness is in the range from about 0.006 inch to about 0.007 inch, and said second thickness is in the range from about 0.0005 inch to about 0.001 inch.

18. The profile sealing strip of claim 17, wherein said first material is a material selected from the group consisting of polyethylene terephthalates, high density polyethylene, low density polyethylene, linear low density polyethylene, and polypropylene, and said second material is a material selected from the group consisting of ethylene vinyl acetate, ethylene acrylic acid, a polymer rubber resin blend, and ethylene-methyl acrylate.

19. A profile sealing strip to be affixed to a package to provide said package with a resealable closure device, comprising:

a lateral flange made of a first material and having a first section, a second section, and a middle section being disposed between and connected to said first and second sections, said first and second sections having a length, an upper surface, a lower surface, an edge, and a projection, said projection extending downwardly for a first distance from said lower surface adjacent said edge, said middle section having a lowermost segment extending downwardly for a second distance from said lower surfaces;

a closure portion made of said first material and having a base connected to said middle section of said lateral flange, said closure portion protruding beyond said upper surfaces of said first and second sections; and sealant layers made of a second material, a first of said sealant layers being affixed to said lower surface of said first section between said projection of said first section and said middle section, a second of said sealant layers being affixed to said lower surface of said second section between said projection of said second section and said middle section.

20. The profile sealing strip of claim 19, wherein said first material and said second material have a substantially different coefficient of thermal expansion.

21. The profile sealing strip of claim 19, wherein said first material is a material selected from the group consisting of polyethylene terephthalates, high density polyethylene, low density polyethylene, linear low density polyethylene, and polypropylene, and wherein said second material is a material selected from the group consisting of ethylene vinyl acetate, ethylene acrylic acid, a polymer rubber resin blend, and ethylene-methyl acrylate.

22. The profile sealing strip of claim 19, wherein said first distance is substantially the same as said second distance.

23. The profile sealing strip of claim 22, wherein said first and second distances are in the range from approximately 0.002 inch to about 0.003 inch, and said first and second sections have a thickness approximately in the range from about 0.006 inch to about 0.008 inch, and wherein said sealant layers have a thickness in the range from about 0.002 inch to about 0.003 inch.

24. A profile sealing strip to be affixed to a package to provide said package with a resealable closure device, comprising:

a lateral flange made of a first material and having a first section, a second section, and a middle section disposed between and connected to said first and second sections, said first and second sections having a length, an upper surface, a lower surface, and a plurality of ribs extending downwardly from said lower surfaces along said lengths, adjacent ones of said plurality of ribs forming a channel therebetween, said middle section having a lowermost segment extending downwardly at least to said plurality of ribs;

a closure portion made of said first material having a base connected to said middle portion of said lateral flange, said closure portion protruding beyond said upper surfaces of said first and second sections of said lateral flange; and sealant layers made of a second material, a first of said sealant layers being affixed to said plurality of ribs and said lower surface on said first section, a second of said sealant layers being affixed to said plurality of ribs and said lower surface on said second section.

25. The profile sealing strip of claim 24, wherein said first material and said second material have a substantially different coefficient of thermal expansion.

26. The profile sealing strip of claim 24, wherein said first material is a material selected from the group consisting of polyethylene terephthalates, high density polyethylene, low density polyethylene, linear low density polyethylene, and polypropylene, and wherein said second material is a material selected from the group consisting of ethylene vinyl acetate, ethylene acrylic acid, a polymer rubber resin blend, and ethylene-methyl acrylate.

27. The profile sealing strip of claim 26, wherein a thickness of said sealant layers between adjacent ones of said plurality of ribs is in the range from about 0.002 inch to about 0.003 inch.

28. The profile sealing strip of claim 26, wherein a thickness of said lateral flange is in the range of about 0.006 inch to about 0.008 inch.

29. The profile sealing strip of claim 24, wherein a thickness of said sealant layers below said plurality of ribs is approximately 0.0005 inch.

30. The profile sealing strip of claim 24, wherein said lowermost segment extends beyond said sealant layer.

31. A profile sealing strip to be affixed to a package and provide said package with a resealable closure device, said profile sealing strip comprising:
   a lateral flange being made of a first material and having a first section, a second section, and a middle section being disposed between and connected to said first and second sections, said first and second sections each having a length, an upper surface, a lower surface, and an edge;
   a closure portion being made of a second material and having a base connected to said middle section, said closure portion protruding beyond said upper surfaces of said first and second sections; and
   sealant layers being made of a second material and attached at a plurality of points along said lower surfaces of said first and second sections of said lateral flange, said sealant layers having a sinusoidal shape with peaks and valleys, said peaks being said plurality of points at which said sealant layers are attached.

32. The profile sealing strip of claim 31, wherein one of said peaks is positioned on said edge of said section and another of said peaks is positioned on said edge of said second section.

33. The profile sealing strip of claim 32, wherein one of said peaks is positioned along one side of said middle section, and another of said peaks is positioned along another side of said middle section.

34. The profile sealing strip of claim 31, wherein one of said peaks is positioned along one side of said middle section, and another of said peaks is positioned along another side of said middle section.

35. The profile sealing strip of claim 31, wherein said first material and said second material have a substantially different coefficient of thermal expansion.

36. The profile sealing strip of claim 31, wherein said first material is a material selected from the group consisting of polyethylene terephthalates, high density polyethylene, low density polyethylene, linear low density polyethylene, and polypropylene, and wherein said second material is a material selected from the group consisting of ethylene vinyl acetate, ethylene acrylic acid, a polymer rubber resin blend, and ethylene-methyl acrylate.

37. The profile sealing strip of claim 36, wherein said lateral flange has a thickness in the range from about 0.006 inch to about 0.008 inch, and said sealant layers have a thickness in the range from about 0.002 inch to about 0.003 inch.

38. The profile sealing strip of claim 31, wherein said sealant layers include a plurality of projections extending in an upward direction, each of said plurality of projections having a top portion, said top portions being said plurality of points at which said sealant layer is attached.

39. The profile sealing strip of claim 38, wherein each of said plurality of projections has a substantially triangular cross-section.

40. The profile sealing strip of claim 38, wherein said sealant layers further include a void located behind a respective one of said plurality of projections.

41. The profile sealing strip of claim 40, wherein each of said voids is located on a surface of said sealant layers opposite said plurality of projections.

42. The profile sealing strip of claim 38, wherein said first material is a material selected from the group consisting of polyethylene terephthalates, high density polyethylene, low density polyethylene, linear low density polyethylene, and polypropylene, and wherein said second material is a material selected from the group consisting of ethylene vinyl acetate, ethylene acrylic acid, a polymer rubber resin blend, and ethylene-methyl acrylate.

43. The profile sealing strip of claim 42, wherein said lateral flange has a thickness in the range from about 0.006 inch to about 0.008 inch, and said sealant layers has a thickness in the range from about 0.002 inch to about 0.003 inch.

44. The profile sealing strip of claim 38, wherein said first material and said second material have a substantially different coefficient of thermal expansion.

45. A profile sealing strip to be affixed to a package and provide said package with a resealable closure device, said profile sealing strip comprising;
   a lateral flange being made of a first material and having a first section, a second section, and a middle section disposed between and adjacent to said first and second sections, said first and second sections each having a length, an upper surface, and a lower surface;
   a closure portion being made of said first material and having a base connected to said middle section, said closure portion protruding beyond said upper surfaces of said first and second sections;
   sealant layers being made of a second material and attached to said lower surfaces of said first and second sections of said lateral flange; and
   secondary layers attached to said upper surfaces of said first and second sections of said lateral flange,
   wherein said first material and said second material have substantially different coefficients of thermal expansion.

46. The profile sealing strip of claim 45, wherein said secondary layers are made of said second material.

47. The profile sealing strip of claim 46, wherein said second material is a material selected from the group consisting of ethylene vinyl acetate, ethylene acrylic acid, a polymer rubber resin blend, and ethylene-methyl acrylate.

48. The profile sealing strip of claim 45, wherein said secondary layers are made of a third material, and wherein said third material and said second material have coefficients of thermal expansion that are within twenty percent.

49. The profile sealing strip of claim 45, wherein said first material is a material selected from the group consisting of polyethylene terephthalates, high density polyethylene, low density polyethylene, linear low density polyethylene, and polypropylene.

50. The profile sealing strip of claim 45, wherein said lateral flange has a thickness in the range from about 0.006 inch to about 0.008 inch, said sealant layers have a thickness in the range from about 0.003 to about 0.004 inch, and said secondary layers have a thickness in the range from about 0.003 inch to about 0.004 inch.

51. The profile sealing strip of claim 45, wherein said middle section extends in an upward direction equal to or beyond an uppermost edge of said secondary layers.

52. The profile sealing strip of claim 51, wherein said secondary layers made of said second material.

53. The profile sealing strip of claim 52, wherein said second material is a material selected from the group consisting of ethylene vinyl acetate, ethylene acrylic acid, a polymer rubber resin blend, and ethylene-methyl acrylate.

54. The profile sealing strip of claim 51, wherein said lateral flange has a thickness in the range from about 0.002 inch to about 0.004 inch, said sealant layers have a thickness in the range from about 0.002 to about 0.004 inch, and said secondary layers have a thickness in the range from about 0.002 inch to about 0.004 inch.

55. The profile sealing strip of claim 51, wherein said secondary layers are made of a third material, and wherein said third material and said second material have coefficients of thermal expansion that are within twenty percent.

56. The profile sealing strip of claim 51, wherein said first material is a material selected from the group consisting of polyethylene terephthalates, high density polyethylene, low density polyethylene, linear low density polyethylene, and polypropylene.

57. A profile sealing strip to be affixed to a package and provide said package with a resealable closure device, said profile sealing strip comprising;
- a lateral flange being made of a first material having a first section, a second section, and a middle section disposed between and connected to said first and second section, said first and second sections each having a length, an upper surface, and a lower surface;
- a closure portion having a base connected to said middle section and protruding beyond said upper surfaces of said first and second sections;
- buffer layers being made of a second material attached to said lower surfaces of said first and second sections of said lateral flange; and
- sealant layers being made of a third material attached to said buffer layers,
- wherein said first material and said third material have substantially different coefficients of thermal expansion.

58. The profile sealing strip of claim 57, wherein said second material has a coefficient of thermal expansion which is between coefficients of thermal expansion for said first and third materials.

59. The profile sealing strip of claim 57, wherein said first material is a material selected from the group consisting of polyethylene terephthalates, high density polyethylene, low density polyethylene, linear low density polyethylene, and polypropylene.

60. The profile sealing strip of claim 57, wherein said third material is a material selected from the group consisting of ethylene vinyl acetate, ethylene acrylic acid, a polymer rubber resin blend, and ethylene-methyl acrylate.

61. The profile sealing strip of claim 57, wherein said lateral flange has a thickness in the range from about 0.006 inch to about 0.008 inch, said sealant layer has a thickness in the range from about 0.002 to about 0.003 inch, and said buffer layer has a thickness in the range from about 0.001 inch to about 0.002 inch.

* * * * *